United States Patent
Ciou et al.

(10) Patent No.: US 8,936,743 B2
(45) Date of Patent: Jan. 20, 2015

(54) METHOD OF MAKING A POLYLACTIC ACID BASED ARTICLE

(75) Inventors: Chi-Wei Ciou, Taipei (TW); Li-Ling Chang, Taipei (TW); Roy Wu, Taoyuan Hsien (TW)

(73) Assignee: Far Eastern New Century Corporation, Taipei (TW)

(*) Notice: Subject to any disclaimer, the term of this patent is extended or adjusted under 35 U.S.C. 154(b) by 479 days.

(21) Appl. No.: 13/285,334

(22) Filed: Oct. 31, 2011

(65) Prior Publication Data

US 2012/0104655 A1    May 3, 2012

(30) Foreign Application Priority Data

Nov. 1, 2010   (TW) ................. 99137457 A

(51) Int. Cl.
*B29C 51/42*   (2006.01)
*B29C 51/00*   (2006.01)

(52) U.S. Cl.
CPC ........... *B29C 51/42* (2013.01); *B26K 2067/046* (2013.01); *B29C 51/002* (2013.01); *B29B 2911/14906* (2013.01); *B29C 51/421* (2013.01)
USPC ........................................ 264/322

(58) Field of Classification Search
CPC .... B29C 51/42; B29C 51/421; B29C 51/002; B29K 2067/046

USPC ......................................... 264/322
See application file for complete search history.

(56) References Cited

U.S. PATENT DOCUMENTS

| | | |
|---|---|---|
| 6,018,004 A | 1/2000 | Warzelhan et al. |
| 6,020,393 A | 2/2000 | Khemani |
| 6,114,042 A | 9/2000 | Warzelhan et al. |
| 7,129,301 B2 | 10/2006 | Wu et al. |
| 2005/0165142 A1 | 7/2005 | Nishimura et al. |
| 2007/0259195 A1* | 11/2007 | Chou et al. .................. 428/480 |
| 2009/0186990 A1 | 7/2009 | Inui et al. |
| 2009/0311511 A1 | 12/2009 | Obuchi et al. |

* cited by examiner

*Primary Examiner* — Yogendra Gupta
*Assistant Examiner* — Kimberly A Stewart
(74) *Attorney, Agent, or Firm* — Morgan, Lewis & Bockius LLP

(57) ABSTRACT

A method of making a polylactic acid based article includes: (a) providing a sheet having a crystallinity ranging from 0% to 15% and including a polylactic acid polymer composition, the polylactic acid polymer composition having a polylactic acid polymer, a copolyester polymer, and a crystal nucleating agent; (b) heating the sheet to maintain a surface of the sheet at a temperature ranging from 95° C. to 105° C. while keeping the crystallinity of the sheet lower than 20%; and (c) thermoforming the sheet in a mold having a temperature ranging from 95° C. to 130° C. so as to form a polylactic acid based article having a crystallinity ranging from 35% to 45%.

13 Claims, No Drawings

METHOD OF MAKING A POLYLACTIC ACID BASED ARTICLE

CROSS-REFERENCE TO RELATED APPLICATION

This application claims priority of Taiwanese application no. 099137457, filed on Nov. 1, 2010.

BACKGROUND OF THE INVENTION

1. Field of the Invention

This invention relates to a method of making a polylactic acid based article, more particularly to a method of making a heat-resistant polylactic acid based article using a thermoforming process.

2. Description of the Related Art

The research in biodegradable material is under progressive development in order to solve the problem of plastic waste that causes serious environmental impacts. Polylactic acid (PLA) is one of the most valuable biodegradable materials because raw materials of PLA are completely plant materials. However, PLA has a poor heat-resistant property which limits the applications thereof.

Generally, PLA is subjected to a long-term heating treatment under an appropriate temperature so as to increase the crystallinity and improve the heat-resistant property thereof. Because the crystallization rate of PLA is relatively slow which leads to a longer cycle time for formation, PLA needs a relatively longer time to increase the crystallinity thereof. However, during a heating treatment at an elevated temperature, the cycle time of PLA would be increased, thereby resulting in an even longer time for increasing the crystallinity of PLA and a higher manufacturing cost that can not meet commercialization demands.

In order to solve the aforesaid problems, crystal nucleating agents such as talc powder, isinglass, and low molecular weight plasticizer are mixed with PLA during manufacture so as to accelerate crystallization rate of PLA. However, the cycle time is still too long.

In addition, in order to achieve desired heat resistance and impact resistance and higher productivity, U.S. Patent Application Publication No. 2005/0165142 discloses a PLA composition containing PLA, a polyester, and a crystal nucleating agent. The optical purity of the polylactic acid and a residual lactide amount in the polylactic acid should be precisely controlled. Moreover, as shown in Table 2, the temperature inside a die (i.e., heat temperature) is 120°C. or more. The relatively high die temperature will cause poor yield rate due to sticking phenomenon that occurred between the die and a final article or uneven wall thickness of the final article. Besides, when the temperature inside the die is reduced to, e.g. 120° C., the time for heat treatment has to be increased to 15 seconds (see Example 9 of Table 2). In Comparative Example 12 of Table 2, when the temperature is reduced to 100° C., the time for heat treatment has to be increased to 60 seconds, and the final article has poor heat resistance. Therefore, the commercial desire for low die temperature and short time for heat treatment can not be accomplished in this publication.

U.S. Patent Application Publication No. 2009/0311511 discloses a PLA composition and a process for making a thermoformed PLA device. The PLA composition includes 100 parts by weight of PLA, 0.1 to 3 parts by weight of an organic crystal nucleating agent, and 0.1 to 7 parts by weight of a crystallization accelerator. The thermoforming process includes preheating a PLA based sheet containing the PLA composition to a temperature of 60° C. to 130° C. so as to increase the crystallinity of the PLA based sheet to a range from 20% to 50%, followed by a thermoforming step. The preheating step allows a shorter duration of the successive thermoforming step, which may overcome the aforesaid drawback of the relatively long cycle time. However, an excessively increased crystallinity may adversely influence extensibility of the preheated PLA based sheet, thereby resulting in a lower yield of the thermoforming process and deformations such as cracks on the thermoformed PLA device.

US 2009/0186990 discloses a polylactic acid based heat-resistant sheet suitable for molding. The polylactic acid based heat-resistant sheet contains a polylactic acid and a polylactic acid-based copolymer, and an optional amide crystal nucleating agent. In this publication, a molded article prepared from the polylactic acid based heat-resistant sheet has a crystallization index of 20 J/g~35 J/g. From the disclosure of the publication, the object of the publication is to reduce the time for thermoforming by increasing the degree of crystallization of the polylactic acid based heat-resistant sheet. Therefore the problem of lower yield and deformations still remains.

The inventors of this invention find that, in a method for producing an article from the PLA composition containing PLA, polyester, and a crystal nucleating agent, the temperature and crystallinity are important factors for controlling properties of the article. In other words, when the temperature and crystallinity are not within a specific range, the article thus made would have inferior properties, e.g., poor thermal resistance, poor dimensional stability, etc.

SUMMARY OF THE INVENTION

Therefore, the object of the present invention is to provide a method of making a heat-resistant polylactic acid based article, in which the sheet temperature, mold temperature and crystallinity are controlled to provide desired properties for the polylactic acid based article.

According to the present invention, a method of making a polylactic acid based article comprises: (a) providing a sheet having a crystallinity ranging from 0% to 15% and including a polylactic acid polymer composition, the polylactic acid polymer composition having a polylactic acid polymer, a copolyester polymer, and a crystal nucleating agent; (b) heating the sheet to maintain a surface of the sheet at a temperature ranging from 95° C. to 105° C. while keeping the crystallinity of the sheet lower than 20%; and (c) thermoforming the sheet in a mold having a temperature ranging from 95° C. to 130° C. so as to form a polylactic acid based article having a crystallinity ranging from 35% to 45%.

DETAILED DESCRIPTION OF THE PREFERRED EMBODIMENTS

According to the preferred embodiment of the present invention, a method of making a polylactic acid based article comprises: (a) providing a sheet having a crystallinity ranging from 0% to 15% and including a polylactic acid polymer composition, the polylactic acid polymer composition having a polylactic acid polymer, a copolyester polymer, and a crystal nucleating agent; (b) heating the sheet to maintain a surface of the sheet at a temperature ranging from 95° C. to 105° C. while keeping the crystallinity of the sheet lower than 20%; and (c) thermoforming the sheet in a mold having a temperature ranging from 95° C. to 130° C. so as to form a polylactic acid based article having a crystallinity ranging from 35% to 45%.

In the step (a), preferably, the sheet has a crystallinity ranging from 8% to 14%. If the sheet has a crystallinity larger than 20%, the extensibility thereof becomes poor that may lead to deformation of a thermoformed article made therefrom because of an uneven thickness of the article.

Preferably, the amount of the polylactic acid polymer is not lower than 60 wt %, more preferably, in the range of 65-82 wt %, based on the total weight of the polylactic acid polymer composition.

Preferably, the copolyester polymer of the polylactic acid polymer composition is an aliphatic-aromatic copolyester polymer that serves as an impact modifier. Examples of the aliphatic-aromatic copolyester polymer include those disclosed in U.S. Pat. Nos. 7,129,301, 6,020,393, 6,018,004, and 6,114,042, each of which is hereby incorporated by reference in its entirety.

Preferably, the aliphatic-aromatic copolyester polymer is selected from the group consisting of butylene glycol adipate-terephthalate copolymer, butylene glycol succinate-terephthalate copolymer, and combinations thereof. In the preferred embodiment of this invention, the aliphatic-aromatic copolyester polymer is butylene glycol adipate-terephthalate copolymer.

Preferably, the copolyester polymer is present in an amount ranging from 5 to 30 wt % based on the total weight of the polylactic acid polymer composition. If the amount of the copolyester polymer is lower than 5 wt %, the effect for improving impact resistant of the polylactic acid polymer composition would be insignificant. On the other hand, if the amount of the copolyester polymer is larger than 30 wt %, the crystallization rate of the polylactic acid polymer composition would be reduced that may lead to an increase in manufacturing costs. Preferably, the amount of the copolyester polymer ranges from 15 to 30 wt % based on the total weight of the polylactic acid polymer composition.

Preferably, the crystal nucleating agent is an inorganic salt, and is more preferably selected from the group consisting of talc, silicon, porcelain clay, natural clay, and combinations thereof. In the preferred embodiment of this invention, the crystal nucleating agent is talc.

Preferably, the amount of the crystal nucleating agent ranges from 3 to 10 wt %, more preferably, 5 to 9 wt %, based on the total weight of the polylactic acid polymer composition. If the amount of the crystal nucleating agent is lower than 3 wt %, the crystallization rate of the polylactic acid polymer composition would not be improved, thereby resulting in a relatively long cycle time. Moreover, a thermoformed article made therefrom would have an inferior heat-resistant property. If the amount of the crystal nucleating agent is larger than 10 wt %, the manufacturing cost would be increased and a thermoformed article made therefrom would have an inferior impact-resistant property.

It should be noted that, in the preferred embodiment, the sheet composed of the polylactic acid polymer composition is produced by melting and blending the polylactic acid polymer composition in a single screw extruder or a twin screw extruder, followed by extruding and cutting the polylactic acid polymer composition into a plurality of pellets using a pelletizer and extruding the pellets into a plurality of sheets with desired size. Alternatively, the sheet may be produced by any other methods known to those skilled in the art.

In the step (b) of the method of the present invention, preferably, the surface of the sheet is maintained at a temperature ranging from 97° C. to 103° C., and the crystallinity of the sheet is kept to be lower than 19% such that the sheet has superior workability and formability. If the surface temperature of the sheet is lower than 95° C., the sheet would be too hard to be manufactured in the successive thermoforming process. On the other hand, if the surface temperature of the sheet is larger than 105° C., the sheet would become excessively soft and would be unlikely to maintain in a proper form and to stay in a precise position, which might result in discontinuousness of the subsequent thermoforming step, unfavorable thermoforming efficiency, and a low yield in the successive thermoforming process. In addition, when the crystallinity of the sheet is larger than 20%, the sheet may have a poor extensibility that easily results in deformation of a thermoformed article.

In this invention, the sheet may be heated by non-contact heating way using a heating device, such as an oven, an electric hot tray, a ceramic plate, or any other equipments that can provide similar functions.

In the step (c) of the method of the present invention, preferably, the sheet is thermoformed by a hot mold forming process in a mold having a temperature ranging from 100° C. to 125° C. A mold having a temperature lower than 95° C. may cause a relatively low crystallization rate of the polylactic acid polymer composition so that a longer cycle time is required to accomplish a desired heat-resistance for the final article, thereby resulting in an increase in manufacturing costs. If the mold has a temperature larger than 130° C., a sticking phenomenon between the mold and the article would appear that leads to a lower yield. Accordingly, when the mold has a temperature ranging from 95° C. to 130° C., the sheet may be thermoformed in a relatively short time and the thermoformed article made therefrom may have a good structure.

It should be noted that the sheet may be thermoformed using any techniques and equipments that are known to those skilled in the art.

EXAMPLE

Sources of Chemicals

1. Polylactic acid (PLA): commercially available from NatureWorks under a trade name of 4032D, having a melting temperature of 168° C. and a glass transition temperature of 57° C.

2. Biodegradable butylene glycol adipate-terephthalate copolymers: commercially available from Far Eastern New Century Corporation under trade names of FEPOL (having a glass transition temperature of about −33° C. and a melting temperature of 140° C.).

3. Inorganic talc powder: Microtalc I.T.

Equipment

1. Hot mold forming machine: commercially available from Kuang Hsing Plastic Machinery Co., Ltd., Taiwan, under a trade name of SP100 which is a vacuum forming machine having a cylindrical mold and a temperature control system for controlling the temperature of the mold.

2. Differential scanning calorimeter (DSC): commercially available from Perkin Elmer and used for measuring crystallization half-life time ($t_{1/2}$) and crystallinity.

TEST EXAMPLES 1 to 3 (TE1-TE3)

74 wt % of polylactic acid, 18 wt % of butylene glycol adipate-terephthalate copolymer (FEPOL), and 8 wt % of inorganic talc powder were melted and blended in a twin screw extruder, followed by being extruded into strands and cut into a plurality of pellets by a pelletizer. The pellets were subsequently disposed in a single screw extruder and were extruded into PLA based sheets having a thickness of 0.4 mm and a crystallinity of 14%.

Each of the PLA based sheets for TE1 to TE3 was disposed on a transporting belt of a hot forming machine so as to preheat and soften the PLA based sheet using an electric heating plate that was disposed below the transporting belt and that was set up at a temperature of 250° C. The surface temperature and the crystallinity of each of the preheated PLA based sheets for TE1 to TE3 were controlled according to the heating duration during the preheating process. Table 1 shows the heating duration of the preheating process, as well as the surface temperature and the crystallinity of the preheated PLA based sheets for each of TE1 to TE3, which were measured immediately after the preheating process.

Subsequently, the preheated and softened PLA based sheets were subjected to a thermoforming process using a mold so as to form PLA based articles. The mold was a cylindrical mold having a diameter of 90 mm and a height of 30 mm and was maintained at a temperature of 25° C. The time for thermoforming in each of the test examples is shown in Table 1.

In each of TE1 to TE3, several PLA based articles were obtained to determine the transference (i.e., shape transferring accuracy), dimensional stability after release of the PLA based article from the mold, and the uniformity of thickness thereof using naked eyes. The results are shown in Table 2, in which crystallinity of each of the thermoformed PLA based articles for TE1 to TE3 was measured using DSC.

COMPARATIVE TEST EXAMPLES 1 to 5 (CTE1 to CTE5)

The preparation processes and measurements of Comparative Test Examples 1 to 5 (CTE1 to CTE5) were the same as those of TE1 to TE3, except that the conditions in the preheating process were varied. The conditions in the preheating process are shown in Table 1. The measurement results are shown in Table 2.

TABLE 1

| TE/CTE | Heating Duration (sec) | Temperature of electric heating plate (° C.) | Surface Temperature of the preheated PLA based sheet (° C.) | Crystallinity of preheated PLA based sheet (%) | Time for Thermoforming (sec) |
|---|---|---|---|---|---|
| TE1 | 4 | 250 | 100 | 15 | 4 |
| TE2 | 5 | 250 | 102 | 17 | 5 |
| TE3 | 8 | 250 | 101 | 19 | 8 |
| CTE1 | 10 | 250 | 100 | 23 | 10 |
| CTE2 | 12 | 250 | 101 | 28 | 12 |
| CTE3 | 15 | 250 | 100 | 35 | 15 |
| CTE4 | 4 | 230 | 86 | 15 | 4 |
| CTE5 | 4 | 270 | 114 | 16 | 4 |

TABLE 2

| TE/CTE | Crystallinity of thermoformed PLA based article (%) | Dimensional stability | Uniformity of thickness | Transference |
|---|---|---|---|---|
| TE1 | 15 | ◎ | ◎ | ◎ |
| TE2 | 17 | ◎ | ◎ | ◎ |
| TE3 | 19 | ◎ | ◎ | ◎ |
| CTE1 | 23 | ◎ | ○ | ○ |
| CTE2 | 28 | ◎ | ○ | ○ |
| CTE3 | 35 | ◎ | Δ | Δ |
| CTE4 | 15 | ◎ | Δ | Δ |
| CTE5 | 15 | ○ | Δ | Δ |

*◎ represents that 85% of the PLA based articles achieves the property requirement; ○ represents that 50% to 80% of the PLA based articles achieves the property requirement; and Δ represents that lower than 50% of the PLR based articles achieves the property requirement.

According to Tables 1 and 2, even though the time for thermoforming and the mold temperature (25° C.) are the same, e.g., TE1, CTE4, and CTE5, the crystallinity of the thermoformed PLA based article and the yield of the thermoforming process are still influenced by the conditions in the preheating process. Moreover, as shown in CTE1 to CTE3, the transference, dimensional stability, and uniformity of thickness of the thermoformed PLA based article are inferior when the crystallinity of the preheated PLA based sheet is higher than 20%. Therefore, the crystallinity of preheated PLA based sheet can not exceed 20%. When the surface temperature of the preheated PLA based sheet is relatively low, as shown in CTE4, the preheated PLA based sheet is too rigid, thereby resulting in poor uniformity of thickness and transference. However, as shown in CTE 5, an excessively high surface temperature of the preheated PLA based sheet also results in inferior properties of the PLA based articles formed therefrom. Therefore, the surface temperature of the preheated PLA based sheet during the preheating process is preferably at a temperature ranging from 95° C. to 105° C.

It should be noted that, although the PLA based articles in TE1 to TE3 have superior transference, dimensional stability, and uniformity of thickness, since the mold has a temperature of 25° C., which much lower than the temperature (95-130° C.) required in step (c) all of the articles in TE1 to TE3 have poor heat resistance which was determined through a water leakage phenomenon. The experiments for water leakage will be described in the following Examples 1 to 5.

EXAMPLES 1 to 5 (E1 to E5) and COMPARATIVE EXAMPLES 1 to 3 (CE1 CE3)

The preparation processes and measurements of Examples 1 to 5 and Comparative Examples 1 to 3 were the same as those of TE1 to TE3, except for the conditions in the preheating step and thermoforming step. The conditions for E1 to E5 and CE1 to CE3 are shown in Table 3. The results of dimensional stability, uniformity of thickness, and the crystallinity of the thermoformed PLA based articles for each of E1 to E5 and CE1 to CE3 are shown in Table 4.

In each of E1 to E5 and CE1 to CE3, the thermoformed PLA based article was made in the form of a lid for a cup. The lid in each of E1 to E5 and CE1 to CE3 covered a cup filled with 100° C. hot water. The cup was inclined at 45 degrees to allow the hot water to be in contact with the lid. After 2 minutes, the deformation of the lids and water leakage were observed to determine the heat resistance of the lids. As shown in Table 4, "v" represents no water leakage that indicates good heat resistance, and "x" represents water leakage attributed to deformation of the lids. The dimensional stability was measured after the lids were released from the mold, and the uniformity of thickness of the lids was observed using naked eye. The measurement results are shown in Table 4.

TABLE 3

| Example/CE | Heating Duration (sec) | Surface Temp. of preheated PLA based sheet (° C.) | Crystallinity of preheated PLA based sheet (%) | Time for Thermo-forming (sec) | Mold Temp. (° C.) |
|---|---|---|---|---|---|
| E1 | 7 | 100 | 15 | 7 | 95 |
| E2 | 7 | 101 | 16 | 7 | 100 |
| E3 | 7 | 100 | 16 | 7 | 110 |
| E4 | 7 | 102 | 17 | 7 | 115 |
| E5 | 7 | 100 | 17 | 7 | 125 |
| CE1 | 7 | 85 | 14 | 7 | 95 |
| CE2 | 7 | 110 | 23 | 7 | 125 |
| CE3 | 7 | 100 | 17 | 7 | 135 |

TABLE 4

| Example/CE | Crystallinity of thermoformed PLA based article (%) | Dimensional stability | Uniformity of thickness | Heat resistance |
|---|---|---|---|---|
| E1 | 35 | ⊚ | ⊚ | V |
| E2 | 38 | ⊚ | ⊚ | V |
| E3 | 38 | ⊚ | ⊚ | V |
| E4 | 39 | ⊚ | ⊚ | V |
| E5 | 42 | ⊚ | ⊚ | V |
| CE1 | 29 | ⊚ | Δ | X |
| CE2 | 43 | ⊚ | Δ | X |
| CE3 | 35 | Δ | Δ | X |

*⊚ represents that 85% of the PLA based articles, i.e., lids, achieves the property requirement; and Δ represents that lower than 50% of the PLA based articles achieves the property requirement.

The relatively low yield of CE3 is attributed to a sticking phenomenon that occurred between the mold and the article, i.e., the lid, caused by a relatively high mold temperature. In addition, as shown in CE1, because of the low surface temperature of the preheated PLA based sheet which resulted in a rigid property for the preheated PLA based sheet, uniformity of thickness of the lid became worse and water leakage occurred poor heat resistance). In CE2, because the crystallinity of the preheated PLA based sheet in the preheating process is larger than 20%, the extensibility of the same is deficient, thereby resulting in a relatively low uniformity of thickness and poor heat resistance of the lid.

In conclusion, by using the polylactic acid polymer composition and by controlling the surface temperature and crystallinity of the PLA based sheet, i.e., lower than 20%, in the preheating step and the mold temperature in the thermoforming step, the thermoformed PLA based article made from the method of the present invention has a great thermal resistance, and the transference, dimensional stability, and uniformity of thickness thereof can be improved. Moreover, with the copolyester polymer in the polylactic acid polymer composition, $t_{1/2}$ can be reduced and Dart Drop Impact can be improved.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. A method of making a polylactic acid based article, comprising:
 (a) providing a sheet having a crystallinity ranging from 0% to 15% and including a polylactic acid polymer composition, the polylactic acid polymer composition having a polylactic acid polymer, a copolyester polymer, and a crystal nucleating agent;
 (b) heating the sheet to maintain a surface of the sheet at a temperature ranging from 95° C. to 105° C. while simultaneously keeping the crystallinity of the sheet lower than 20%; and
 (c) thermoforming the sheet in a mold having a temperature ranging from 95° C. to 130° C. so as to form a polylactic acid based article having a crystallinity ranging from 35% to 45%.

2. The method of claim 1, wherein the amount of the polylactic acid polymer is not lower than 60 wt % based on the total weight of the polylactic acid polymer composition.

3. The method of claim 2, wherein the amount of the polylactic acid polymer ranges from 65 to 82 wt % based on the total weight of the polylactic acid polymer composition.

4. The method of claim 1, wherein the copolyester polymer is an aliphatic-aromatic copolyester polymer.

5. The method of claim 4, wherein the copolyester polymer is butylene glycol adipate-terephthalate copolymer.

6. The method of claim 5, wherein the amount of the aliphatic-aromatic copolyester polymer ranges from 5 to 30 wt % based on the total weight of the polylactic acid polymer composition.

7. The method of claim 6, wherein the amount of the aliphatic-aromatic copolyester polymer ranges from 15 to 30 wt % based on the total weight of the polylactic acid polymer composition.

8. The method of claim 1, wherein the crystal nucleating agent is an inorganic salt.

9. The method of claim 8, wherein the crystal nucleating agent is talc.

10. The method of claim 8, wherein the amount of the crystal nucleating agent ranges from 3 to 10 wt % based on the total weight of the polylactic acid polymer composition.

11. The method of claim 1, wherein, in step (a), the sheet has a crystallinity ranging from 8% to 14%.

12. The method of claim 11, wherein, in step (b), the surface of the sheet is maintained at a temperature ranging from 97° C. to 103° C.

13. The method of claim 1, wherein, in step (c), the mold has a temperature ranging from 100° C. to 125° C.

* * * * *